United States Patent
Thiel et al.

(10) Patent No.: US 9,802,555 B2
(45) Date of Patent: Oct. 31, 2017

(54) VEHICLE BODY SEAL WITH TRIM STRIP

(71) Applicant: CQLT SAARGUMMI TECHNOLOGIES S.À.R.L., Remich (LU)

(72) Inventors: Daniel Thiel, Beckingen (DE); Thomas Jungmann, Beckingen (DE)

(73) Assignee: CQLT SAARGUMMI TECHNOLOGIES S.À.R.L., Remich (LU)

( * ) Notice: Subject to any disclaimer, the term of this patent is extended or adjusted under 35 U.S.C. 154(b) by 0 days.

(21) Appl. No.: 15/304,041

(22) PCT Filed: Apr. 4, 2015

(86) PCT No.: PCT/EP2015/000727
§ 371 (c)(1),
(2) Date: Oct. 13, 2016

(87) PCT Pub. No.: WO2015/158418
PCT Pub. Date: Oct. 22, 2015

(65) Prior Publication Data
US 2017/0036619 A1    Feb. 9, 2017

(30) Foreign Application Priority Data
Apr. 17, 2014    (DE) .................. 10 2014 105 518

(51) Int. Cl.
*B60R 13/00* (2006.01)
*B60R 13/06* (2006.01)
(Continued)

(52) U.S. Cl.
CPC ............. *B60R 13/06* (2013.01); *B60J 10/265* (2016.02); *B60J 10/30* (2016.02); *B60J 10/36* (2016.02); *B60J 10/88* (2016.02); *B60R 13/04* (2013.01)

(58) Field of Classification Search
CPC ........ B60R 13/06; B60R 13/04; B60J 10/265; B60J 10/30; B60J 10/36; B60J 10/88
(Continued)

(56) References Cited

U.S. PATENT DOCUMENTS 4,750,781 A * 6/1988 Betteridge ............. B60J 7/1642
  24/297
8,656,644 B2 * 2/2014 Ertl ......................... B60J 10/75
  49/377
(Continued)

FOREIGN PATENT DOCUMENTS

DE    202005019332 U1    2/2006
DE    102010039774 A1    3/2012
(Continued)

*Primary Examiner* — Joseph D Pape
(74) *Attorney, Agent, or Firm* — Lucas & Mercanti, LLP

(57) ABSTRACT

An arrangement having a sealing profile of a vehicle body seal and a trim strip connectable to the sealing profile with the trim strip being pressed against the sealing profile perpendicularly to the longitudinal direction of the profile. Two connecting projections running parallel to and at a distance from each other in the longitudinal direction of the strip protrude from the trim strip. The sealing profile has groove recesses running in the longitudinal direction of the profile for receiving one connecting projection each. The connecting projections are undercut, as seen counter to the press-on direction, and the groove recesses are undercut in the press-on direction. The undercuts of the groove recesses are formed by rib projections for engagement in one undercut each of the connecting projections. The rib projections are tongues which are elastically bendable by the connecting projections when the trim strip is pressed onto the sealing profile.

7 Claims, 2 Drawing Sheets

(51) Int. Cl.
*B60R 13/04* (2006.01)
*B60J 10/88* (2016.01)
*B60J 10/265* (2016.01)
*B60J 10/30* (2016.01)
*B60J 10/36* (2016.01)

(58) Field of Classification Search
USPC .......... 296/146.9; 49/495.1, 490.1, 441, 506
See application file for complete search history.

(56) References Cited

U.S. PATENT DOCUMENTS

| | | | |
|---|---|---|---|
| 9,027,284 B2 * | 5/2015 | Murree | E06B 7/2314 49/441 |
| 2011/0143113 A1 | 6/2011 | Hatta et al. | |
| 2012/0313330 A1 | 12/2012 | Scalf et al. | |

FOREIGN PATENT DOCUMENTS

| DE | 102011119102 A1 | 5/2013 |
|---|---|---|
| EP | 2363324 A1 | 9/2011 |
| WO | 2009146742 A1 | 12/2009 |

* cited by examiner

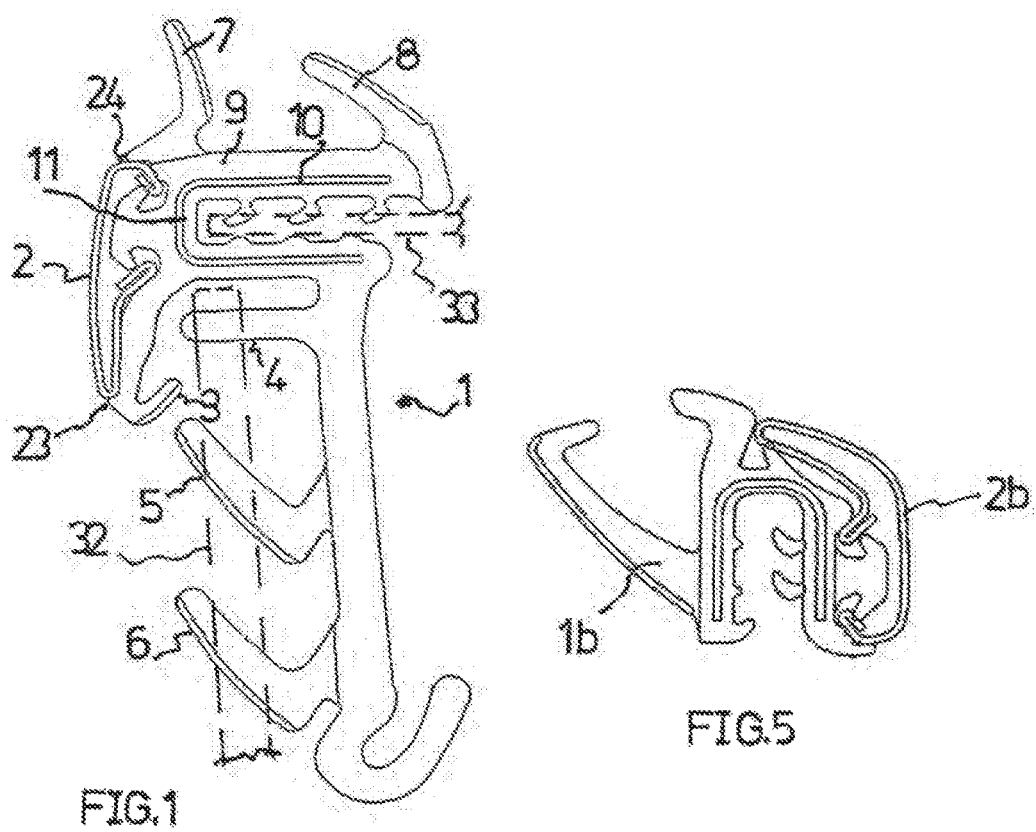
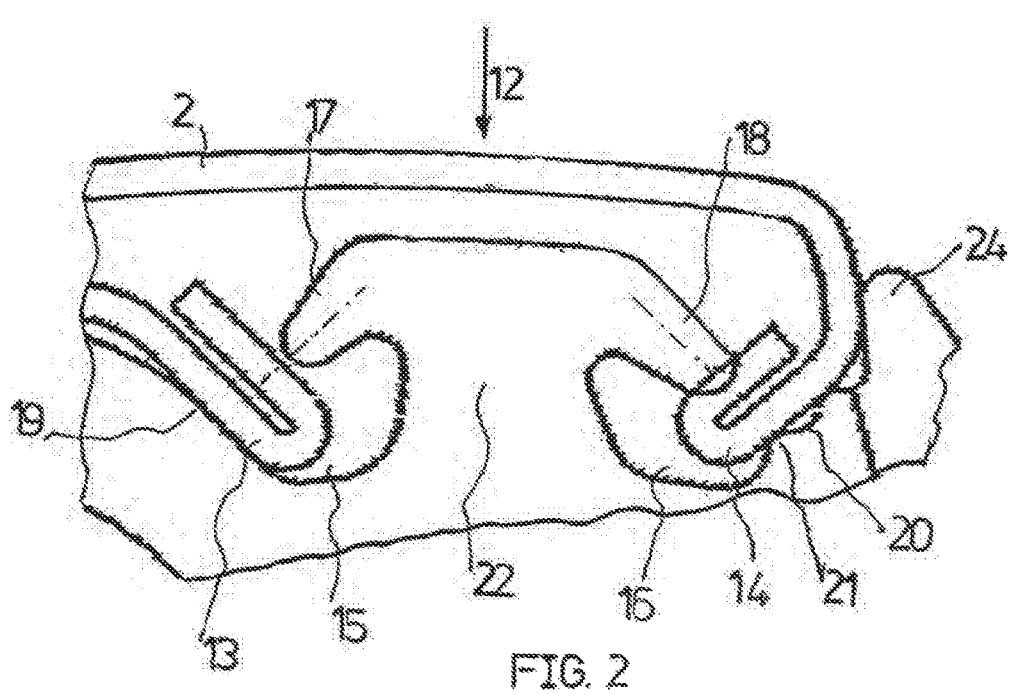

VEHICLE BODY SEAL WITH TRIM STRIP

The present application is a 371 of International application PCT/EP2015/000727, filed Apr. 4, 2015, which claims priority of DE 10 2014 105 518.7, filed Apr. 17, 2014, the priority of these applications is hereby claimed and these applications are incorporated herein by reference.

BACKGROUND OF THE INVENTION

The invention relates to an arrangement comprising a sealing profile of a vehicle body seal and a trim strip which can be connected to the sealing profile by pressing the trim strip against the sealing profile perpendicularly relative to the profile longitudinal direction, wherein there project from the trim strip two connection projections which extend in the longitudinal direction of the strip parallel with each other and spaced apart, the sealing profile has groove recesses which extend in the profile longitudinal direction for each receiving a connection projection, the connection projections when viewed counter to the pressing direction and the groove recesses when viewed in the pressing direction are undercut and the undercuts of the groove recesses are formed by rib projections for engagement in an undercut of the connection projections, respectively.

An arrangement shown in FIG. 6 of such a type comprising a sealing profile 1' and a trim strip 2' is known through use. In an intermediate portion 22' of the sealing profile 1' located between groove recesses there is formed a recess 31 which provides the portion 22' with flexibility and which enables the production of a positive-locking and non-positive-locking connection between the trim strip 2' and the sealing profile 1' by pressing the trim strip 2' against the sealing profile 1'.

SUMMARY OF THE INVENTION

An object of the present invention is to provide a new arrangement of the type mentioned in the introduction comprising a sealing profile and a trim strip which can be connected to the sealing profile and which with respect to the known arrangement requires less structural space with a simplified cross-section structure of the sealing profile.

The arrangement which achieves this objective according to the invention is characterized in that the rib projections are constructed as tongues which, when the trim strip is pressed onto the sealing profile, can be resiliently bent away by the connection projections and which in the connection position act counter to the connection projections in the manner of a barb.

Advantageously, the connection between the trim strip and the sealing profile can be carried out so as to save structural space simply by deformation of the resilient tongues with relatively little pressing force, whilst the tongues which counteract in the manner of a barb in the connection position after the connection projections have been returned ensure that the trim strip is securely retained on the sealing profile.

Advantageously, the intermediate portion of the sealing profile, which portion is located between the groove recesses and from which the tongues protrude, can be constructed in a solid manner without recesses from solid material.

The tongues which protrude from the intermediate portion advantageously expand in the pressing direction and are, for example, inclined through 45° relative to the pressing direction.

Conversely, the connection projections may be shaped in such a manner that they extend toward each other in the pressing direction, wherein the undercuts are formed by this path.

The connection projections may comprise end portions with sides which are preferably parallel with each other, wherein the end portions in the connection position are in abutment with one side against an abutment face of the sealing profile and the other side of the ribs is opposite the free end of the relevant tongue.

Advantageously, at least one of the tongues is located with the center axis thereof perpendicularly on the relevant end portion.

From at least one of the abutment faces, there may protrude projections which increase the surface pressure and consequently the retention force.

In another embodiment, the trim strip is connected to the sealing profile with the sealing profile being deformed. Advantageously, the profile strip is consequently under tension which enables play-free retention of the trim strip on the sealing profile.

In another embodiment of the invention, at least one of the tongues has a sliding layer which facilitates the resilient bending by the connection projections and in particular ensures a secure return.

The tongues may comprise a more flexible material than the adjacent intermediate portion of the sealing profile. Conversely, in one embodiment, the tongues could be formed from a harder, less flexible elastomer material than the intermediate portion.

Torques which counteract each other may in particular act on the trim strip.

The invention is explained in greater detail below with reference to exemplary embodiments and the appended drawings which relate to these exemplary embodiments and in which:

BRIEF DESCRIPTION OF THE DRAWING

FIG. 1 shows an arrangement according to the invention,
FIG. 2 is a detailed illustration of the arrangement of FIG. 1,
FIG. 5 is a third exemplary embodiment of an arrangement according to the invention.

DETAILED DESCRIPTION OF THE INVENTION

Figure 3:
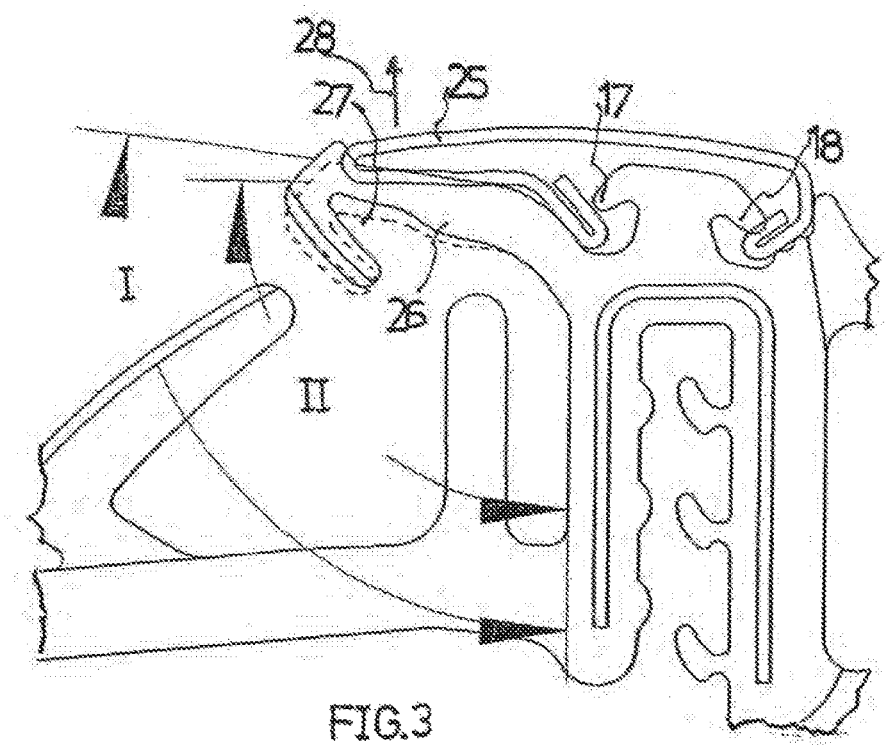
FIG. 3 is an illustration which explains the connection of a trim strip to a sealing profile with pretensioning.

A sealing profile 1 which is shown in FIGS. 1 and 2 as an example is connected to a trim strip 2. The sealing profile 1 serves to seal the bent upper edge of a vehicle window pane 34 and comprises in addition to sealing lips 3 to 8 a securing portion 9 with a metal reinforcement insert 10. The U-shaped securing portion 9 can be fitted to a bodywork flange in order to secure the sealing profile to the vehicle bodywork.

The trim strip 2 which is fitted to the sealing profile 1 opposite a base member 11 of the U-shaped securing portion 9 comprises in the exemplary embodiment shown rolled sheet metal and is, as is optionally also the sealing profile 1, bent in accordance with the path of the upper edge of the vehicle window pane 34 which is intended to be sealed. In addition to the roll-formed metal profile, it is also possible to consider, for example, an extruded aluminum or plastics material profile for the trim strip.

The trim strip 2 can be moved by pressing in accordance with arrow 12, that is to say, in a direction substantially perpendicular to the base member 11 of the sealing profile 1 into the connection position shown in FIGS. 1 and 2, as explained below.

The trim strip 2 has connection projections which comprise end portions 13 and 14 which extend toward each other in an oblique manner relative to the pressing direction in accordance with arrow 12 and which are each formed by two sheet metal layers. The end portions 13 and 14 engage in undercut groove recesses 15 and 16 in the sealing profile 1.

The groove recesses 15, 16 are formed by protruding tongues 17, 18 whose center lines in the connection position shown are located substantially perpendicularly on the end portions 13, 14. The tongues 17, 18 protrude in an oblique manner from an intermediate portion 22 of the sealing profile 21 remaining between the groove recesses 15, 16.

The end portion 13 is in abutment with an abutment face 19 of the sealing profile 1. An abutment face 20 with two projections 21 serves to support the end portion 14.

The intermediate portion 22 of the sealing profile 1, which portion is located between the undercut groove recesses 15, 16, is constructed in a solid manner from solid material.

In order to produce the connection shown in FIGS. 1 and 2 between the sealing profile 1 and the trim strip 2, the trim strip 2 is placed in accordance with arrow 12 on the sealing profile 1 and pressed on until the end portions 13, 14 move into abutment against the abutment faces 19, 20. During this pressing operation, the tongues 17, 18 were resiliently bent away by the end portions 13, 14 and are as a result of the resilient restoring force thereof again moved into the connection position shown in FIGS. 1 and 2. In this position, the tongues protrude in a barb-like manner with the center line thereof substantially perpendicular relative to the end portions 13, 14 of the connection projections of the trim strip. Undesirable releasing of the trim strip 2 from the sealing profile 1 is substantially prevented as a result of this barb-like effect.

Lugs 23, 24 which protrude at the lateral edges of the trim strip 1 also ensure, in the event of an unfavorable combination of production tolerances, a visually excellent connection between the portions.

As can be seen in FIG. 3, a portion 25 of the trim strip 2 is in abutment against a portion 26 of the sealing profile 1, which portion, in the connection described above between the trim strip and sealing profile, is bent from the position I into the position II indicated by a broken line 27. A torque is thereby produced in accordance with arrow 28. The counter-torque produced also ensures that the trim strip 2 is connected to the sealing profile 1 in a play-free manner in the event of an unfavorable combination of production tolerances.

Figure 4:
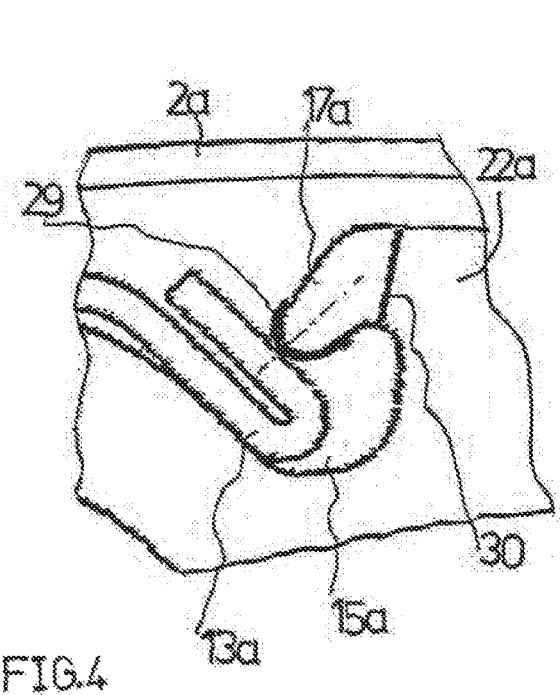
FIG. 4 is a detailed view of an arrangement according to a second exemplary embodiment.
Figure 6:
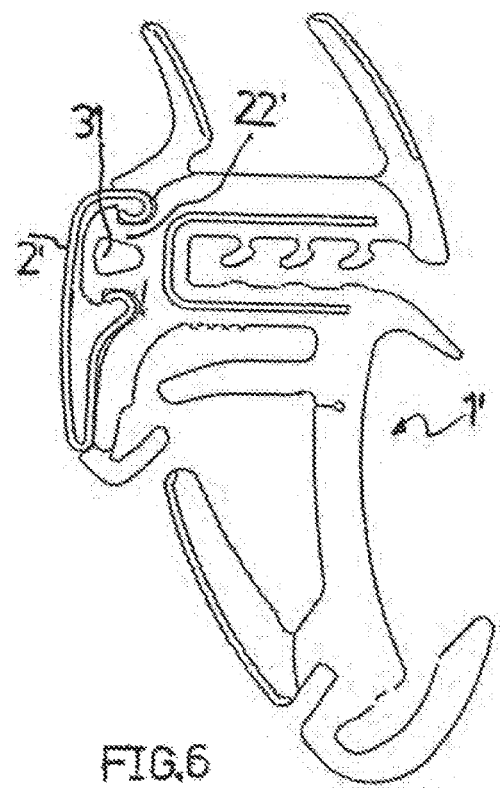
FIG. 6 shows an arrangement according to the prior art.

FIG. 4 is a cut-out of an exemplary embodiment in which a tongue 17a in a region in which it comes into contact with an end portion 13 of the trim strip 2 is provided with a sliding layer 29 which in particular promotes the return of the tongue 17a into the securing position shown in FIG. 4.

The tongue 17a further comprises a more flexible elastomer material than an adjacent intermediate region 22a. A material boundary is formed at 30. Of course, the measures described with reference to the tongue 17a can also be implemented with the second tongue which is not shown.

FIG. 5 shows an exemplary embodiment of an arrangement comprising a sealing profile 1b which forms a window recess trim and a trim strip 2b which is fitted to the sealing profile 1b.

The invention claimed is:

1. An arrangement comprising: a sealing profile of a vehicle bodywork seal; and a trim strip connectable to the sealing profile by pressing the trim strip against the sealing profile perpendicularly relative to a longitudinal direction of the profile, wherein two connection projections project from the trim strip and extend in the longitudinal direction of the strip parallel to and spaced apart from one another, the sealing profile having groove recesses that extend in the longitudinal direction for each receiving one of the connection projections, the connection projections when viewed counter to a pressing direction and the groove recesses when viewed in the pressing direction are undercut and the undercuts of the groove recesses are formed by rib projections for engagement in the undercut of the connection projections, respectively, wherein the rib projections are tongues that, when the trim strip is pressed onto the sealing profile, are resiliently bent away by the connection projections to enter a connection position in which the tongues form barbs that protrude relative to the connection projections, wherein the sealing profile has an intermediate region of solid material arranged between the groove recesses, wherein the tongues laterally protrude from the intermediate region, wherein the connection projections comprise end portions that extend toward each other in the pressing direction, wherein the sealing profile has an abutment face and the end portions in the connection position have one side that rests against the abutment face of the sealing profile and have a side facing away from the one side that is opposite a free end of one of the tongues so that only the free end of the tongue faces the end portion.

2. The arrangement according to claim 1, wherein the tongues spread apart from each other in the pressing direction.

3. The arrangement according to claim 1, wherein at least one of the tongues is located with a center axis thereof perpendicular to one of the end portions.

4. The arrangement according to claim 1, wherein at least one of the abutment faces has protruding projections.

5. The arrangement according to claim 1, wherein the sealing profile is deformed in the connection position by the trim strip so as to ensure a connection without play between the sealing profile and the trim strip.

6. The arrangement according to claim 1, wherein at least one of the tongues has a sliding layer.

7. The arrangement according to claim 1, wherein at least one of the tongues comprises a material that is more flexible than a material of the sealing profile adjacent to the tongue.

* * * * *